G. Wolf,
Cage Trap,
N° 54,241. Patented Apr. 24, 1866.

Witnesses;
G. Breed,
H. Carter.

Inventor;
George Wolf,
Daniel Breed, Atty

UNITED STATES PATENT OFFICE.

GEORGE WOLF, OF WILLIAMSPORT, MARYLAND.

IMPROVEMENT IN ANIMAL-TRAPS.

Specification forming part of Letters Patent No. 54,241, dated April 24, 1866.

*To all whom it may concern:*

Be it known that I, GEORGE WOLF, of Williamsport, in the county of Washington and State of Maryland, have invented a new and useful Improvement in Animal-Traps; and I do hereby declare that the following is a full and exact description thereof, reference being had to the accompanying drawings, and to the letters of reference marked thereon.

My invention consists in a peculiar construction of box-trap with a falling slide, and especially in holding the trip by a friction catch or lock.

Figure 1:
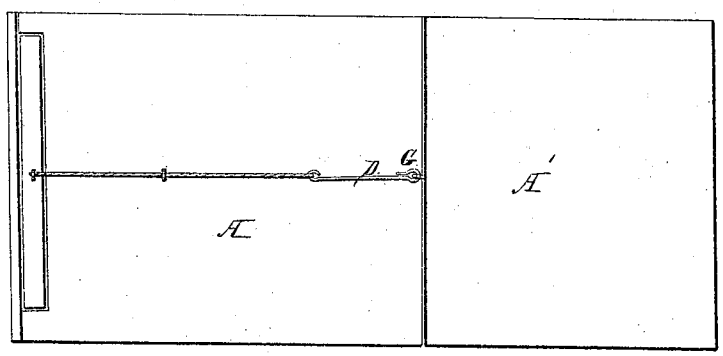
Figure 2:
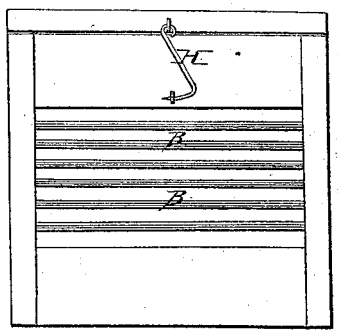
Figure 3:
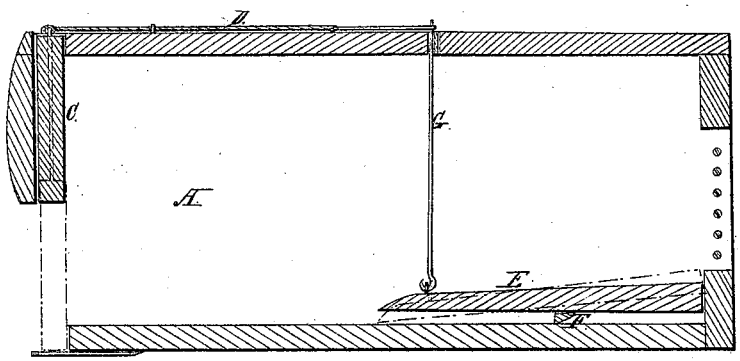

In the accompanying drawings, Figure 1 represents the top of my new trap, the trip being set. Fig. 2 is an end view of the same. Fig. 3 is a vertical longitudinal section near the middle of the box, showing the trip and also the slide with the cord and catch, the motion of the trip and slide being indicated by red lines.

In the construction of my trap a box of suitable form is made, as shown at A, Fig. 1. At one end of this box a door is made for rats, birds, or other animals to enter the trap, and at the other end is a window with bars B, Fig. 2, to allow the animal to see through the box, and thus induce him to enter. The door is provided with a dropping slide, C, Fig. 3, the same being represented in black lines as raised, and in red lines as down or closed. This slide is drawn up by a cord, D, in setting the trap and secured, as will be soon explained.

In the bottom of the box is arranged a trip, E, balanced upon a fulcrum, F, so as to tilt by the smallest weight or tread, the motion of the trip being indicated by red lines. To this trip is attached a wire extending up through the top of the box, as seen in Fig. 3 at G. In setting the trap the upper end of this wire is placed in an eye upon the end of the cord D, so that the weight of the slide C, pulling upon the cord D and eye, will hold the wire G against the side of the hole in the top of the box, and thus by slight friction prevent the wire G from sliding down, while this wire holds the slide C from falling. By this arrangement the trip is held poised in the most delicate manner by a friction lock or catch. As an animal enters the trap the slightest pressure upon the trip will draw down the wire and release the cord, when the slide C must fall and entrap the animal with unerring certainty.

The portion A' of the top of the box is made removable in the usual manner, the same being held by pins and a hook, H, Fig. 2.

I do not limit my invention to the precise form and construction above described, and I do not broadly claim either the box, the window, the trip, or the slide as separate devices.

Having thus fully described my invention, what I claim, and desire to secure by Letters Patent of the United States, is—

The above-described trap, provided with the wire G and the eye of the cord D, or with the equivalents of these devices, dependent upon friction alone for holding the trip E, substantially as described.

GEORGE WOLF.

Witnesses:
JACOB B. MASTERS,
WM. STERNE.